US010089760B2

(12) United States Patent
Lee (10) Patent No.: US 10,089,760 B2
(45) Date of Patent: Oct. 2, 2018

(54) TECHNIQUES FOR DYNAMICALLY DISPLAYING PIE CHARTS FOR DIRECT COMPARISON

(71) Applicant: AUTODESK, Inc., San Rafael, CA (US)

(72) Inventor: Michael Lee, Mississauga (CA)

(73) Assignee: AUTODESK, INC., San Rafael, CA (US)

( * ) Notice: Subject to any disclaimer, the term of this patent is extended or adjusted under 35 U.S.C. 154(b) by 81 days.

(21) Appl. No.: 14/831,853

(22) Filed: Aug. 20, 2015

(65) Prior Publication Data

US 2017/0053425 A1   Feb. 23, 2017

(51) Int. Cl.
*G06T 11/20* (2006.01)
*G06F 3/0484* (2013.01)

(52) U.S. Cl.
CPC ........ *G06T 11/206* (2013.01); *G06F 3/04845* (2013.01)

(58) Field of Classification Search
None
See application file for complete search history.

(56) References Cited

U.S. PATENT DOCUMENTS

| | | | | |
|---|---|---|---|---|
| 2003/0218619 A1* | 11/2003 | Ben-Tovim | ......... | G06F 3/04845 345/649 |
| 2008/0092086 A1* | 4/2008 | Hamadi | ............. | G06F 3/04847 715/863 |
| 2008/0192056 A1* | 8/2008 | Robertson | ............... | G06T 13/80 345/440 |
| 2010/0253686 A1* | 10/2010 | Alsbury | ................ | G06T 11/206 345/440 |
| 2011/0141923 A1* | 6/2011 | Young | .................... | G06T 11/206 370/252 |
| 2012/0272186 A1* | 10/2012 | Kraut | ..................... | G06F 3/0488 715/810 |
| 2012/0324388 A1* | 12/2012 | Rao | ........................ | G06F 3/0488 715/771 |
| 2015/0310648 A1* | 10/2015 | Matange | ................ | G06Q 10/00 345/440 |
| 2016/0027193 A1* | 1/2016 | Schiffer | .................. | G06F 17/24 345/440 |

* cited by examiner

*Primary Examiner* — Ryan M Gray
(74) *Attorney, Agent, or Firm* — Artegis Law Group, LLP (57) ABSTRACT

Techniques for dynamically displaying corresponding segments of related pie charts are implemented by a UI engine, pie chart engine, and graphics framework engine that operate in conjunction to display at least two related pie charts having a plurality of corresponding segments, receive a user selection of corresponding segments that are displayed in different positions in their respective pie charts, rotate at least one of the related pie charts, and display the related pie charts so that the corresponding segments are displayed in the same position/orientation in their respective pie charts. The computing device may also visually highlight the selected corresponding segments and execute an animation graphically displaying the rotation of the at least one related pie chart.

16 Claims, 6 Drawing Sheets

TECHNIQUES FOR DYNAMICALLY DISPLAYING PIE CHARTS FOR DIRECT COMPARISON

BACKGROUND OF THE INVENTION

Field of the Invention

Embodiments of the present invention generally relate to computer science and, more specifically, to techniques for dynamically displaying pie charts for direct comparison.

Description of the Related Art

Pie charts are widely used to visually illustrate the relative proportions of different components of a composite whole. A pie chart may comprise any circular graphic representation of quantitative information that is divided into segments, where the sizes of the segments are proportional to the quantities the different segments represent. Many software applications are configured to create and display pie charts, making these type of graphics very popular in business or educational settings.

Software applications are oftentimes used to produce two related pie charts with corresponding segments to allow visual comparison of the corresponding segments. For example, a first pie chart may show the proportions of US voters in 2013 identifying as Democrat, Republican, and Independent and a second related pie chart may show the proportions of US voters in 2014 identifying as Democrat, Republican, and Independent. When the two pie charts are displayed next to each other, a segment representing the proportion of Democrats in the first pie chart corresponding to a segment representing the proportion of Democrats in the second chart can be visually compared. To assist users in visually comparing the corresponding segments across the two related pie charts, current software applications are configured to display the pie charts side by side and to display corresponding segments with similar appearance (such as with a same color or texture). However, even with such assistance, many users still find comparing corresponding segments across two related pie charts awkward and difficult.

As the foregoing illustrates, what is needed in the art is a more effective technique for displaying related pie charts to allow for a more direct visual comparison of corresponding pie chart segments.

SUMMARY OF THE INVENTION

One embodiment of the invention includes a computer-implemented method for displaying pie charts. The method includes receiving a selection of corresponding segments of at least two pie charts. The corresponding segments share a matching attribute that differentiates the corresponding segments from the other segments of the at least two pie charts. The corresponding segments are initially displayed at different positions within the at least two pie charts. The method also includes rotating at least one of pie charts and displaying the corresponding segments of the at least two pie charts at approximately a same position within the at least two pie charts.

At least one advantage of the disclosed technique is that it provides dynamic and direct visual comparison of corresponding segments across related pie charts that allows users to easily compare the corresponding segments.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
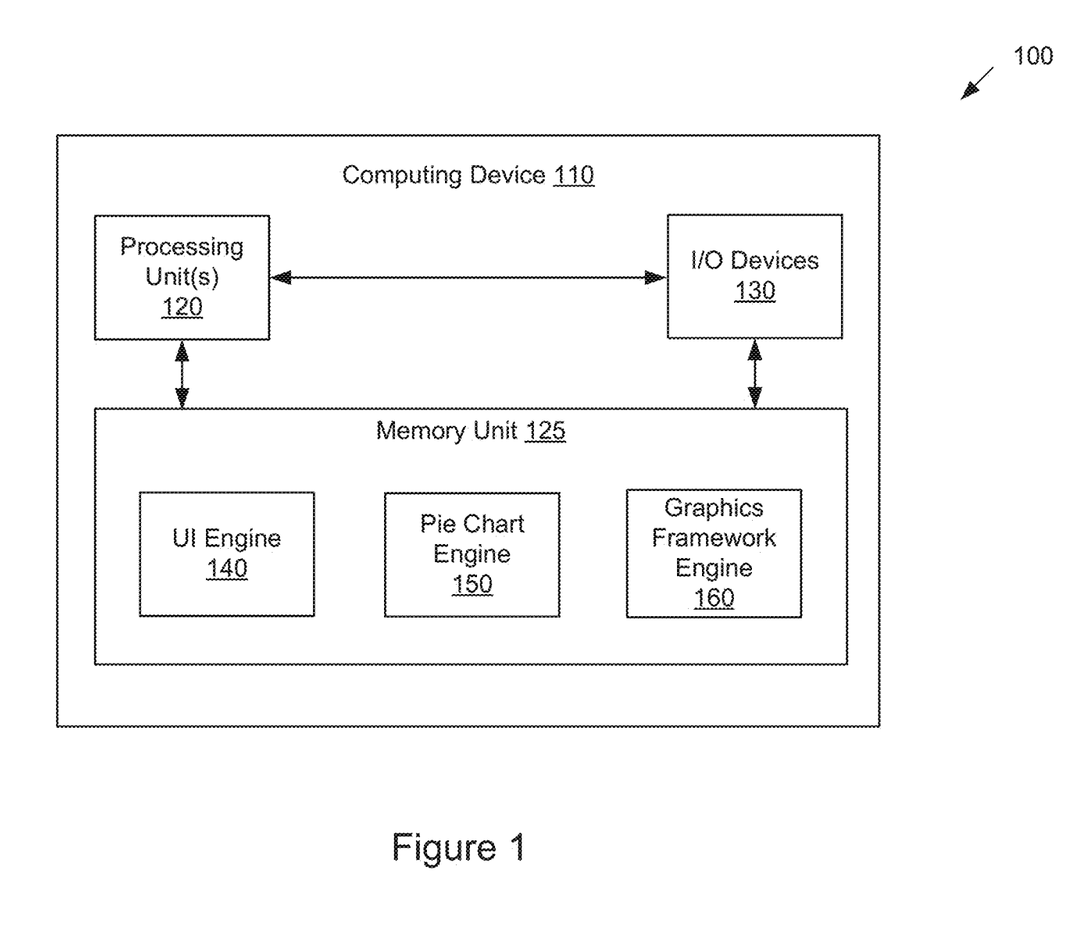
FIG. 1 illustrates a system configured to implement one or more aspects of the present invention.

FIG. 1 illustrates a system 100 configured to implement one or more aspects of the present invention. As shown, the system 100 includes, without limitation, a computing device 110. Computing device 110 may be a server system, client system, workstation, a laptop computer, a tablet, a hand-held device (such as cellular phone), or any other type of computing device.

Computing device 110 includes one or more processing units 120 coupled to input/output (I/O) devices 130 and to memory unit 125. Processing unit(s) 120 may be a central processing unit (CPU), a graphics processing unit (GPU), or a combination of different processing units, such as a CPU configured to operate in conjunction with a GPU. In general, processing unit 120 may be any technically feasible hardware unit capable of processing data and/or executing software applications. I/O devices 130 are also coupled to memory unit 125 and includes input devices capable of receiving user input, output devices capable of generating output, as well as network devices capable of communicating via a network (not shown). Examples of input devices include a keyboard, a mouse, a touchscreen, a microphone, or other input elements. Examples of output devices include a monitor, a printer, or other output elements. The input and output devices allow an end-user access to the system 100. Memory unit 125 includes a user interface (UI) engine 140, a pie chart engine 150, and a graphics framework engine 160. A user may provide inputs received by the UI engine 140 via an input device, for example, to select segments of interest that are displayed in pie charts. Output may be provided to the user by the UI engine 140 via an output device, for example, to display corresponding segments across multiple pie charts in accordance with embodiments described herein.

The UI engine 140 comprises an application that is capable of creating or receiving pie charts and displaying the pie charts. For example, the UI engine 140 may comprise a web browser that receives and displays pie charts or a graphics or business application that creates and displays pie charts. The UI engine 140 may operate in conjunction with the pie chart engine 150 and graphics framework engine 160 to perform embodiments herein. The pie chart engine 150 may comprise a software module executing within an application (such as UI engine 140). For example, the pie chart engine 150 may comprise an add-on module (such as a JavaScript plug-in) that adds specific features and enhancements to an existing software application (such as UI engine 140) to perform embodiments described herein.

The graphics framework engine 160 may comprise a framework and graphics library for producing, displaying, and managing graphics and animations in a user interface (such as a web browser). For example, the graphics framework engine 160 comprises the D3.js JavaScript library for producing dynamic, interactive data visualizations in user interfaces. As known in the art, the D3.js JavaScript library use the widely implemented Scalable Vector Graphics (SVG), Cascading Style Sheets (CSS), and HTML5 standards. As a further example, the graphics framework engine 160 comprises an SVG-based graphics library providing various animation functions. There are several SVG-based graphics libraries publically available for the SVG format that provide functions for animation of images. If the SVG format is used, most all current web browsers include SVG animation and rendering support. In other embodiments, however, the graphics framework engine 160 may comprise any other type of graphics framework to produce and display graphics and animations in a user interface.

The UI engine 140 and/or pie chart engine 150 may implement the graphics framework engine 160 to perform particular functions described herein. For example, the UI engine 140 may instruct the graphics framework engine 160 to produce, display, and manage the related pie charts and the corresponding segments. The pie chart engine 150 may instruct the graphics framework engine 160 to visually highlight/distinguish selected corresponding segments in the related pie charts. The pie chart engine 150 may also instruct the graphics framework engine 160 to produce and execute an animation that graphically displays rotation of at least one related pie chart.

As shown in FIG. 1, the UI engine 140, pie chart engine 150, and graphics framework engine 160 may comprise separate components that operate in conjunction to perform embodiments described herein. In other embodiments, however, the UI engine 140, pie chart engine 150, and graphics framework engine 160 may together comprise an integrated application that performs embodiments described herein.

Related Pie Charts and Corresponding Segments

Figure 2:
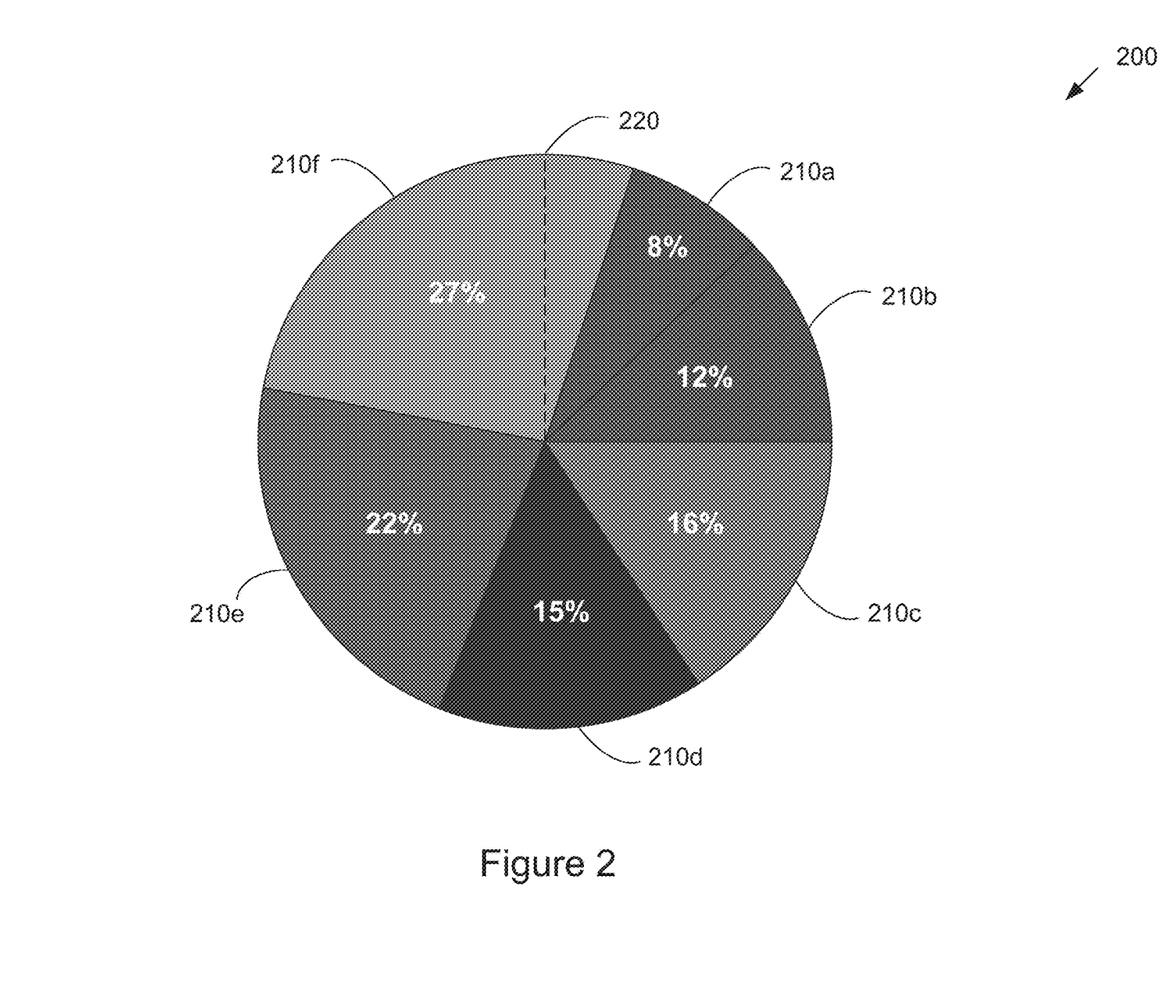
FIG. 2 illustrates a diagram of pie chart, according to one embodiment of the present invention.

FIG. 2 illustrates a diagram of pie chart 200, according to one embodiment of the present invention. As shown in FIG. 2, the pie chart 200 may comprise a plurality of segments 210a-f. Each segment 210 having a different associated central angle that defines the position/orientation of the segment 210 within the pie chart 200. The central angles of the segments 210 are defined by a common angle side 205 in the pie chart 200 and a second angle side that is distinct for each segment 210. The common angle side 205 is typically located at 0 degrees in the pie chart 200, but can be located at any other degree in the pie chart 200. The position of the second angle side for a segment 210 (as defined by the associated central angle) determines the position of the segment 210 within the pie chart 200. For example, the second angle side for a segment 210 may be defined as being the start/beginning, middle, or end of the segment 210. As used herein, the central angle that defines the relative position/orientation of the segment 210 within the pie chart 200 is referred to as the "positional central angle" of a segment 210.

Each segment 210 also has another associated central angle that defines the size of the segment 210, referred to herein as the "size central angle" of a segment 210. The positional central angle of a segment 210 determines the relative position of the segment 210 within the pie chart 200, and thus determines where the segment 210 starts within the pie chart 200. The size central angle of a segment 210 then determines the size of the segment 210, and thus determines where the segment 210 ends within the pie chart 200. The total of all size central angles of the segments 210 of a pie chart 200 equals 360 degrees.

As known in the art, a pie chart 200 comprises a circular statistical graph that graphically/visually represents a collection of data values that is divided into segments to illustrate the proportion of the data values. A pie chart 200 and the collection of data values it represents has multiple attributes/characteristics that describe the pie chart 200 and the collection of data values. For example, a pie chart 200 may represent the amounts of different types of energy sources used in a particular month and year for a particular city. Therefore, the various attributes describing the pie chart 200 (and the collection of data values it represents) include 1) amounts of different types of energy sources, 2) the particular month, 3) the particular year, and 4) the particular city.

Each pie segment 210 graphically/visually represents a particular data value in the collection of data values. Each data value will have at least one attribute that is different and distinct from all other attributes of the other data values in the collection of data values. Likewise, each pie segment 210 will have at least one attribute that is different and distinct from the other attributes of the other pie segments 210 within the same pie chart 200. For example, a first pie segment 210 (and a first data value it represents) may represent the amount of solar energy used in a particular month and year for a particular city and a second pie segment 210 (and a second data value it represents) may represent the amount of wind energy used in the same month and year for the same city. Different segments 210 will typically have a different visual appearance, such as different colors or textures.

The size/area of a segment 210 is proportional to the data value that it represents so that larger data values are represented by larger segments 210. Thus, the size central angle of a segment 210 is also proportional to the data value that it represents. The data values in the collection of data values are typically expressed as numerical values or percentage values. When data values are expressed as numerical values, the sum of all data values in the collection of data values comprises a "total value" that is represented by the entire pie chart 200. For example, each data value may comprise a numerical value for kilowatt hours (kWh) of energy used for a particular energy source in a particular month, and the total value may comprise the total kilowatt hours used for all energy sources in the particular month. When data values are expressed as percentage values, the sum of all data values in the collection of data values comprises a percentage value of 100% which is represented by the entire pie chart 200. For example, each data value may comprise a percentage value for kilowatt hours (kWh) of energy used for a particular energy source in a particular month, the percentage relative to the total 100% of kilowatt hours used for all energy sources in the particular month.

In the example of FIG. 2, the segments 210a-f of the pie chart 200 may represent the percentage amounts of different energy sources used in a particular month and year for a particular city. To illustrate, segment 210a may represent solar energy used (8%), segment 210b may represent wind energy used (12%), segment 210c may represent biofuel energy used (16%), segment 210d may represent waste energy used (15%), segment 210e may represent wood energy used (22%), and segment 210f may represent fossil fuel energy used (27%).

Figure 3:
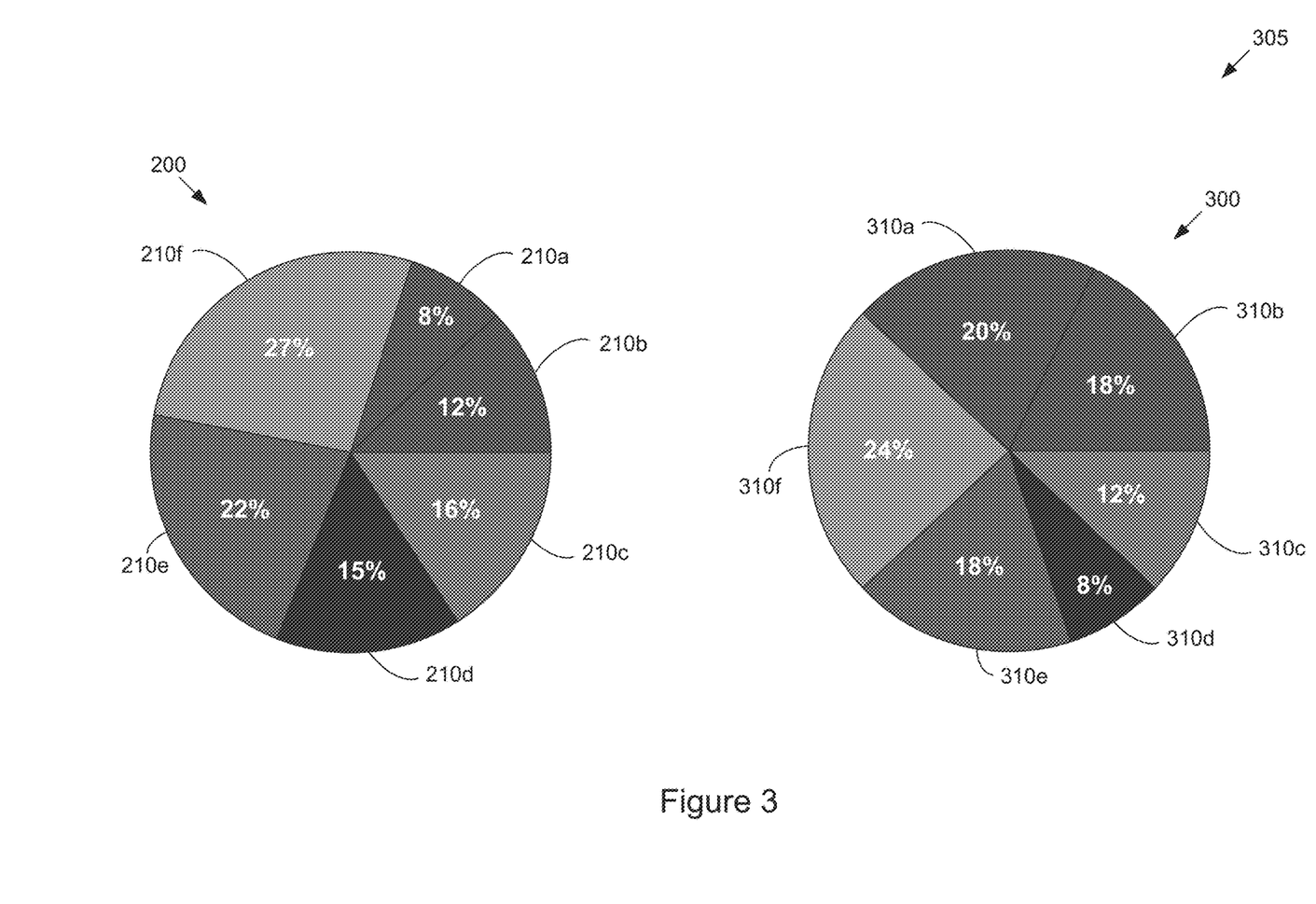
FIG. 3 is a screenshot of a user interface (UI) configured to display related pie charts, according to one embodiment of the present invention.

FIG. 3 is a screenshot of a user interface (UI) 305 configured to display related pie charts, according to one embodiment of the present invention. In operation, the processing unit 120 executes the interface (UI) engine 140 and pie chart engine 150 to display the UI 305 on an I/O device 130 of the computing device 110. As shown in FIG. 3, the UI 305 displays a first pie chart 200 and a second pie chart 300.

As discussed above, a pie chart and the collection of data values it represents has multiple attributes that describe the pie chart and the collection of data values. As used herein, two "related pie charts" comprise pie charts with at least one matching attribute and at least one different attribute. For example, the first pie chart 200 may represent the amounts of different energy sources used in June 2014 for the city of Cleveland and the second pie chart 300 may represent the amounts of different energy sources used in July 2014 for the city of Cleveland. Therefore, the first and second pie charts may comprise related pie charts with matching attributes (the amounts of different energy sources used in a particular month in 2014 for the city of Cleveland) and at least one different attribute (the month). In other words, related pie charts have at least one overlapping attribute and at least one non-overlapping attribute. In the example of FIG. 3, two related pie charts 200 and 300 are displayed. However, in other embodiments, more than two related pie charts may be displayed.

The first pie chart 200 comprises a plurality of segments 210a-f and the second pie chart 300 comprises a plurality of segments 310a-f. The first pie chart 200 represents the amounts of energy sources used in June 2014 for the city of Cleveland, the individual segments 210a-f of the first pie chart 200 discussed above in relation to FIG. 2. The second pie chart 300 represents the amounts of energy sources used in July 2014 for the city of Cleveland, which include segment 310a representing solar energy used (20%), segment 310b representing wind energy used (18%), segment 310c representing biofuel energy used (12%), segment 310d representing waste energy used (8%), segment 310e representing wood energy used (18%), and segment 310f representing fossil fuel energy used (24%).

As used herein, there are "corresponding segments" across related pie charts. Corresponding segments have a same/matching distinguishing attribute that differentiates the corresponding segments from the attributes of all other segments of the related pie charts. The matching distinguishing attribute of the corresponding segments is referred to herein as the "corresponding attribute." For example, corresponding segments may comprise segment 210a in the first pie chart 200 and segment 310a in the second pie chart 300 as they both represent solar energy used (but in different months). Thus, the corresponding attribute is solar energy used since it is the matching attribute that differentiates the corresponding segments from the attributes of all other segments of the related pie charts (such as wind energy used, biofuel energy used, waste energy used, etc.). In the example of FIG. 3, two corresponding segments across two related pie charts are displayed. However, in other embodiments, more than two corresponding segments across more than two related pie charts may be displayed.

To assist users in visually comparing corresponding segments across two related pie charts, the pie charts may be displayed side by side and display corresponding segments with similar appearance (such as with a same color or texture). However, even using these methods, it is still very difficult for users compare corresponding segments across two related pie charts. One of the reasons for this difficulty is that corresponding segments are typically not displayed in the same position within their respective pie charts. For example, corresponding segments 210f and 310f that represent fossil fuel energy used are not displayed in the same position within the first and second pie charts, respectively. Thus, corresponding segment 210f is displayed in a first position in the first pie chart 200 and the corresponding segment 310f is displayed in a second position in the second pie chart 300, the first and second positions being different. In particular, corresponding segment 210f is displayed using a first positional central angle in the first pie chart 200 and the corresponding segment 310f is displayed using a second positional central angle in the second pie chart 300, the first and second positional central angles having different values.

Dynamically Displaying Corresponding Segments of Related Pie Charts

Figure 4:
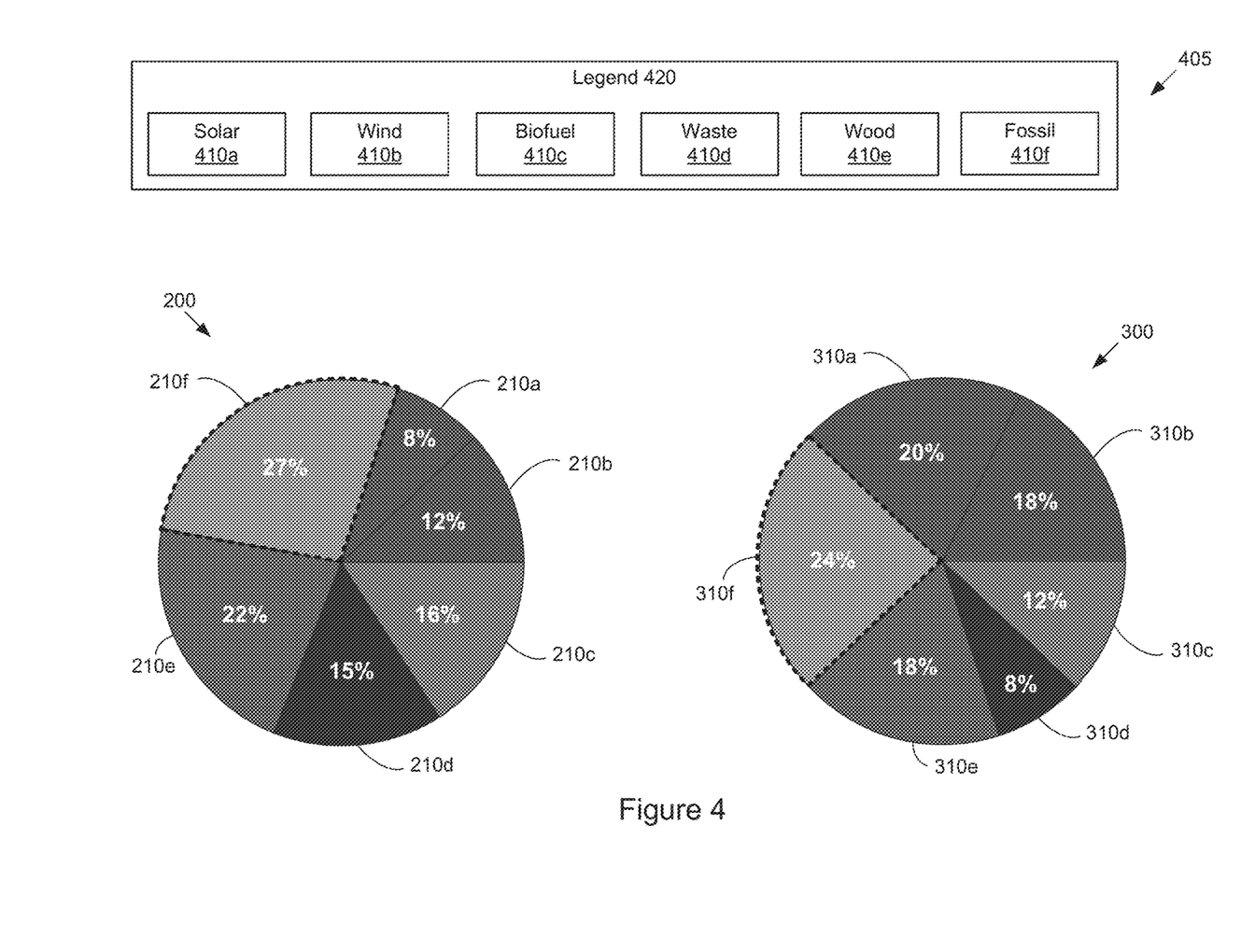
FIG. 4 is a screenshot of a user interface (UI) configured to receive selection of corresponding segments of the related pie charts of FIG. 3, according to one embodiment of the present invention.
Figure 5:
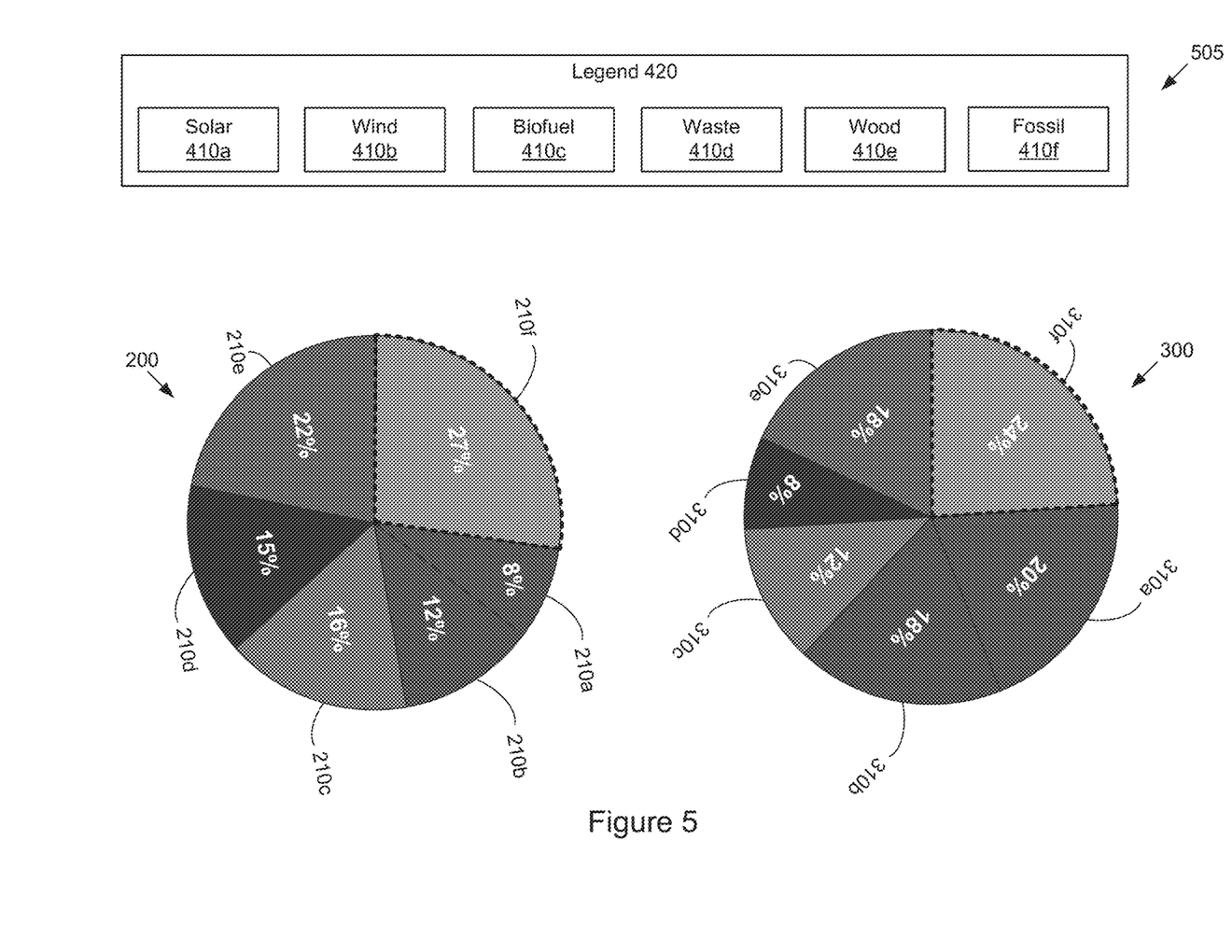
FIG. 5 is a screenshot of a user interface (UI) configured to display at least one rotated pie chart of FIG. 4, according to one embodiment of the present invention.

In some embodiments, at least one related pie chart is rotated so that corresponding segments across related pie charts are displayed in approximately the same position/orientation in their respective pie charts (i.e., have approximately the same positional central angle in their respective pie charts). In these embodiments, the UI engine 140, pie chart engine 150, and graphics framework engine 160 operate in conjunction to dynamically display corresponding segments of related pie charts to allow for direct visual comparison of the corresponding segments. FIGS. 4 and 5 illustrate steps for dynamically displaying selected corresponding segments of related pie charts.

FIG. 4 is a screenshot of a user interface (UI) 405 configured to receive selection of corresponding segments of the related pie charts of FIG. 3, according to one embodiment of the present invention. In operation, the processing unit 120 executes the UI engine 140, pie chart engine 150, and graphics framework engine 160 to display the UI 405 on an I/O device 130 of the computing device 110.

As shown in FIG. 4, the UI 405 displays a first pie chart 200, a second pie chart 300, and a pie chart legend 420. To do so, the UI engine 140 may instruct the graphics framework engine 160 to produce, display, and manage the pie charts and the segments. The UI 405 may receive selection of corresponding segments of the related pie charts through various methods. In one embodiment, the segments 210a-f of the first pie chart 200 and segments 310a-f of the second pie chart 300 each comprise user-selectable segments. The UI 405 may receive selection of a particular segment in one of the pie charts, for example, when the user selects or hovers over the particular segment using an I/O device 130 (e.g., mouse, touchscreen, keyboard, etc.). From the selected segment in one pie chart, the UI 405 then determines the corresponding segment in other pie chart. In this manner, the corresponding segments of the related pie charts have been selected.

In another embodiment, the corresponding segments are selected through use of the pie chart legend 420. As shown in FIG. 4, the legend 420 comprises a plurality of selectable icons 410a-f, each icon 410 representing a particular segment in the related pie charts 200 and 300. The UI 405 may receive selection of a particular segment via the legend 420, for example, when the user selects or hovers over an icon 410 representing a particular segment using an I/O device 130 (e.g., mouse, touchscreen, keyboard, etc.). The UI 405 then determines the segment in each related pie chart that is represented by the selected icon 410. In this manner, the corresponding segments of the related pie charts have been selected.

After receiving selection of the corresponding segments, the UI 405 may then visually highlight/distinguish the selected corresponding segments. To do so, the pie chart engine 150 may instruct the graphics framework engine 160 to visually highlight/distinguish selected corresponding segments by changing the visual appearance of the selected corresponding segments and/or the non-selected segments in the related pie charts. For example, the graphics framework engine 160 may increase the opacity level of the selected corresponding segments and/or decrease the opacity level of the non-selected segments, display the selected corresponding segments in the same color and display all non-selected segments in a different color, change appearance (e.g., increase thickness) of the border of the selected corresponding segments, etc.

In the example of FIG. 4, the corresponding segments 210f and 310f representing fossil fuel energy used are selected. For example, the corresponding segments 210f and 310f may be selected by the user clicking or hovering on segment 210f in the first pie chart 200 or segment 310f in the second pie chart 300, or by the user clicking or hovering on icon 410f (representing fossil fuel energy used) in the legend 420. The UI 405 may then highlight the selected corresponding segments 210f and 310f.

FIG. 5 is a screenshot of a user interface (UI) configured to display at least one rotated pie chart of FIG. 4, according to one embodiment of the present invention. In operation, the processing unit 120 executes the interface (UI) engine 140 and pie chart engine 150 to display the UI 505 on an I/O device 130 of the computing device 110. Optionally, the pie chart engine 150 may use the graphics framework engine 160 to execute animation functions.

At least one related pie chart is rotated so that selected corresponding segments across two or more related pie charts are displayed in the same position/orientation in their respective pie charts. Thus, at least one related pie chart is rotated so that selected corresponding segments are displayed having approximately the same positional central angle in their respective pie charts. In some embodiments, a first pie chart having a first corresponding segment is rotated and displayed so that the position of the first corresponding segment matches the position of a second corresponding segment in a second pie chart (which is not rotated).

In other embodiments, a first pie chart having a first corresponding segment and a second pie chart having a second corresponding segment are rotated and displayed so that the first and second corresponding segments are displayed in the same predetermined position within the first and second pie charts, respectively. For example, the first and second pie charts may be rotated so that the first and second corresponding segments are displayed having a predetermined positional central angle approximately equal to 0, 90, 180, or 270 degrees. In other embodiments, the predetermined positional central angle may comprise other values. As discussed above, the positional central angle of a segment determines the position of the segment and where the segment starts within the pie chart and the size central angle of the segment then determines the size of the segment and where the segment ends within the pie chart.

As shown in FIG. 5, both related pie charts 200 and 300 have been rotated so that the selected corresponding segments 210f and 310f are displayed in the same predetermined position within their respective pie charts 200 and 300. In the example of FIG. 5, the related pie charts 200 and 300 have been rotated so that the selected corresponding segments 210f and 310f are displayed having a predetermined positional central angle approximately equal to 0 degrees. Thus, the corresponding segments 210f and 310f start within their pie charts 200 and 300 at 0 degrees and the size central angles of the segments 210f and 310f will then determine where the segments 210f and 310f end within their respective pie charts 200 and 300. In other embodiments, the selected corresponding segments 210f and 310f may be displayed at another predetermined positional central angle, such as 90, 180, or 270 degrees. In further embodiments, only the first pie chart 200 is rotated so that the corresponding segment 210f matches the position of corresponding segment 310f of the second pie chart 300 (which is not rotated).

Optionally, the UI 505 also displays an animation that graphically displays the actual rotation of the at least one related pie chart. In these embodiments, the pie chart engine 150 may instruct the graphics framework engine 160 to produce and execute an animation that graphically displays rotation of at least one related pie chart.

Figure 6:
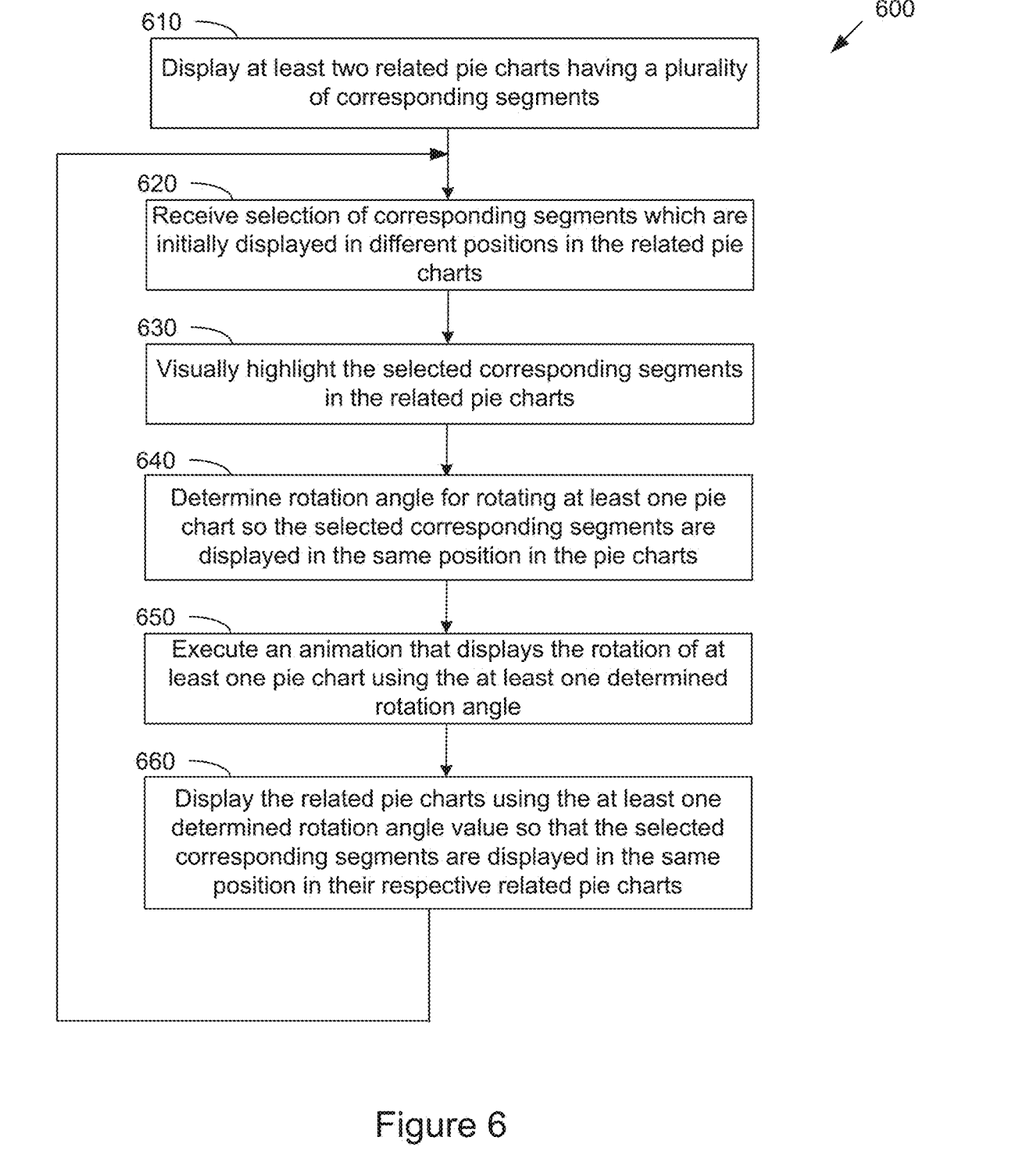
FIG. 6 illustrates a flow diagram of method steps for dynamically displaying corresponding segments of related pie charts, according to one embodiment of the present invention.

FIG. 6 illustrates a flow diagram of method steps for dynamically displaying corresponding segments of related pie charts, according to one embodiment of the present invention. Although the method steps are described in conjunction with the systems of FIGS. 1-5, persons skilled in the art will understand that any system configured to perform the method steps, in any order, is within the scope of the present invention.

As shown, a method 600 begins at step 610, where the UI engine 140 and the graphics framework engine 160, when executed by processing unit 120, display at least two related pie charts having a plurality of corresponding segments. The two related pie charts have at least one matching attribute and at least one different attribute (e.g., pie charts 200 and 300 shown in FIGS. 3-5). Corresponding segments across related pie charts have a same/matching distinguishing attribute that differentiates the corresponding segments from the attributes of all other segments of the related pie charts (e.g., corresponding segments 210f and 310f shown in FIGS. 3-5).

The UI engine 140 then receives from a user, at step 620, a selection of corresponding segments in the related pie charts. For example, the UI engine 140 may receive selection of the corresponding segments through one of the related pie charts or a pie chart legend 420. In some embodiments, the selected corresponding segments are initially displayed in different positions/orientations in their respective pie charts (i.e., have different positional central angle in their respective pie charts).

The UI engine 140 then instructs the graphics framework engine 160 to visually highlight, at step 630, the selected corresponding segments in the related pie charts (e.g., highlight selected corresponding segments 210f and 310f as shown in FIG. 4). For example, the graphics framework engine 160 may change the visual appearance of the selected corresponding segments and/or the non-selected segments in the related pie charts to visually highlight the selected corresponding segments.

The pie chart engine 150 determines, at step 640, at least one rotation angle value (in degrees) for rotating at least one related pie chart so that the selected corresponding segments are displayed in approximately the same position in their respective pie charts (i.e., have approximately the same positional central angle in their respective pie charts). In some embodiments, the at least one rotation angle value is determined based on a clock-wise rotation of the at least one pie chart. In other embodiments, the at least one rotation angle value is determined based on a counter-clock-wise rotation of the at least one pie chart. In some embodiments, the pie chart engine 150 determines a single rotation angle value (in degrees) needed for rotating a first pie chart so that a first corresponding segment in the first pie chart matches the position of a second corresponding segment in a second pie chart (which is not rotated). In other embodiments, the pie chart engine 150 determines a first rotation angle value (in degrees) needed for rotating a first pie chart so that a first corresponding segment is displayed at a predetermined position (predetermined positional central angle) within the first pie chart and a second rotation angle value (in degrees) needed for rotating a second pie chart so that a second corresponding segment is displayed at the same predetermined position (same predetermined positional central angle) within the second pie chart.

The pie chart engine 150 then instructs the graphics framework engine 160, at step 650, to produce and execute an animation that graphically displays the rotation of at least one related pie chart using the at least one determined rotation angle value. If only one pie chart is being rotated, only one animation is executed for the one pie chart being rotated. If two pie charts are being rotated, a separate animation is executed for each of the two pie charts based on the separate rotation angle value determined for each pie chart (at step 640). The graphics framework engine 160 may display the animation(s) over a predetermined/fixed interval of time such that the selected corresponding segments are displayed at the same position/orientation in their respective pie charts at the end of the time interval.

The UI engine 140 then instructs the graphics framework engine 160 to display, at step 660, the related pie charts using the at least one determined rotation angle value so that the selected corresponding segments are displayed in the same position in their respective related pie charts. The method 600 then continues at step 620 where the UI engine 140 receives from a user another selection of corresponding segments in the related pie charts and the method 600 repeats.

In sum, a UI engine 140, a pie chart engine 150, and a graphics framework engine 160 on a computing device 110 are configured to display at least two related pie charts having a plurality of corresponding segments, receive a user selection of corresponding segments that are displayed in different positions/orientations in their respective pie charts, rotate at least one of the related pie charts, and display the related pie charts so that the corresponding segments are displayed in the same position/orientation in their respective pie charts. The UI engine 140, a pie chart engine 150, and a graphics framework engine may also visually highlight the selected corresponding segments and execute an animation graphically displaying the rotation of the at least one related pie chart.

At least one advantage of the disclosed technique is that it provides dynamic and direct visual comparison of corresponding segments across related pie charts. By positioning the selected corresponding segments in the same position/orientation in their respective pie charts, visual comparison of the selected corresponding segments is easier for the viewer. Also, by providing dynamic display of selected corresponding segments in such a manner, several corresponding segments can be easily selected and visually compared.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for displaying pie charts, the method comprising:
   receiving a selection of corresponding segments of at least two pie charts, wherein the selection comprises an indication of a user selecting any of the corresponding segments at an initial position on a display in absence of rotation, the corresponding segments having a matching attribute that differentiates the corresponding segments from the other segments of the at least two pie charts, the corresponding segments initially being displayed at different positions in the at least two pie charts;
   after receiving the selection, rotating a first pie chart included in the at least two pie charts, but not a second pie chart included in the at least two pie charts, such that a first corresponding segment in the first pie chart is in approximately the same relative position as a second corresponding segment in the second pie chart; and
   displaying the corresponding segments of the at least two pie charts at approximately a same relative position within the at least two pie charts.

2. The computer-implemented method of claim 1, wherein:
   displaying the corresponding segments of the at least two pie charts comprises displaying the first corresponding segment of the first pie chart at approximately the same relative position of the second corresponding segment of the second pie chart.

3. The computer-implemented method of claim 1, wherein displaying the corresponding segments of at least two pie charts at approximately the same relative position within the at least two pie charts comprises displaying the corresponding segments at approximately a same central angle within the at least two pie charts.

4. The computer-implemented method of claim 3, wherein the same central angle comprises a same predetermined central angle of 0 degrees, 90 degrees, 180 degrees, or 270 degrees.

5. The computer-implemented method of claim 1, wherein the at least two pie charts comprise a plurality of matching attributes and at least one different attribute.

6. The computer-implemented method of claim 1, wherein receiving the selection of the corresponding segments of the at least two pie charts comprises receiving the selection of the corresponding segments through a legend that is configured to display representations of the different segments of the at least two pie charts.

7. The computer-implemented method of claim 1, wherein receiving the selection of the corresponding segments of the at least two pie charts comprises receiving the selection of the corresponding segments through one of the at least two pie charts.

8. The computer-implemented method of claim 1, further comprising:
   determining a rotation angle for rotating the first pie chart; and
   executing an animation that visually displays the first pie chart rotating based on the rotation angle.

9. A non-transitory computer-readable medium storing program instructions that, when executed by a processor, cause the processor to displaying pie charts by performing the steps of:
   receiving a selection of corresponding segments of at least two pie charts, wherein the selection comprises an indication of a user selecting any of the corresponding segments at an initial position on a display in absence of rotation, the corresponding segments having a matching attribute that differentiates the corresponding segments from the other segments of the at least two pie charts, the corresponding segments initially being displayed at different positions in the at least two pie charts;
   after receiving the selection, rotating a first pie chart included in the at least two pie charts, but not a second pie chart included in the at least two pie charts, such that a first corresponding segment in the first pie chart is in approximately the same relative position as a second corresponding segment in the second pie chart; and
   displaying the corresponding segments of the at least two pie charts at approximately a same position in the at least two pie charts by displaying the first corresponding segment of the first pie chart at approximately the same position at which the second corresponding segment of the second pie chart is displayed.

10. The non-transitory computer-readable medium of claim 9, wherein displaying the corresponding segments of at least two pie charts at approximately the same position in the at least two pie charts comprises displaying the corresponding segments at approximately a same central angle in the at least two pie charts.

11. The non-transitory computer-readable medium of claim 10, wherein the same central angle comprises a same predetermined central angle of 0 degrees, 90 degrees, 180 degrees, or 270 degrees.

12. The non-transitory computer-readable medium of claim 9, wherein the at least two pie charts comprising a plurality of matching attributes and at least one different attribute.

13. The non-transitory computer-readable medium of claim 9, wherein receiving the selection of the corresponding segments of the at least two pie charts comprises receiving the selection of the corresponding segments through a legend that is configured to display representations of the different segments of the at least two pie charts.

14. The non-transitory computer-readable medium of claim 9, wherein receiving the selection of the corresponding segments of the at least two pie charts comprises receiving the selection of the corresponding segments through one of the at least two pie charts.

15. The non-transitory computer-readable medium of claim 9, further comprising the steps of:
   determining a rotation angle for rotating the first pie chart; and
   executing an animation that visually displays the first pie chart rotating based on the rotation angle.

16. A system configured for displaying pie charts, comprising:
   a memory that includes a user interface (UI) engine, pie chart engine, and a graphics framework engine; and
   a processor coupled to the memory, wherein, upon executing the UI engine, the pie chart engine, and the graphics framework engine, is configured to:
      receive a selection of corresponding segments of at least two pie charts, wherein the selection comprises an indication of a user selecting any of the corresponding segments at an initial position on a display in absence of rotation, the corresponding segments having a matching attribute that differentiates the corresponding segments from the other segments of the at least two pie charts, the corresponding segments initially being displayed at different positions in the at least two pie charts;
      after the selection is received, rotate a first pie chart included in the at least two pie charts, but not a second pie chart included in the at least two pie charts, such that a first corresponding segment in the first pie chart is in approximately the same relative position as a second corresponding segment in the second pie chart, to display the corresponding segments of the first pie chart and the second pie chart at approximately a same position in the first pie chart and in the second pie chart.

\* \* \* \* \*